(12) United States Patent
Park et al.

(10) Patent No.: US 11,197,347 B2
(45) Date of Patent: Dec. 7, 2021

(54) APPARATUS AND METHOD FOR COMMUNICATING BY USING BLUETOOTH LOW ENERGY

(71) Applicant: Samsung Electronics Co., Ltd., Suwon-si (KR)

(72) Inventors: Chunho Park, Suwon-si (KR); Namyong Kang, Suwon-si (KR); Ihlho Kim, Suwon-si (KR); Yunsik Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 16/530,285

(22) Filed: Aug. 2, 2019

(65) Prior Publication Data
US 2020/0053831 A1 Feb. 13, 2020

(30) Foreign Application Priority Data
Aug. 8, 2018 (KR) .................. 10-2018-0092713

(51) Int. Cl.
*H04W 8/26* (2009.01)
*H04W 88/06* (2009.01)
(Continued)

(52) U.S. Cl.
CPC .......... *H04W 88/06* (2013.01); *H04B 17/318* (2015.01); *H04W 4/80* (2018.02);
(Continued)

(58) Field of Classification Search
CPC ........ H04W 88/06; H04W 80/02; H04W 8/26
(Continued)

(56) References Cited

U.S. PATENT DOCUMENTS

| 9,338,635 B2 | 5/2016 | Palin et al. |
| 9,544,755 B2 | 1/2017 | Palin et al. |

(Continued)

FOREIGN PATENT DOCUMENTS

| KR | 10-1597077 B1 | 2/2016 |
| KR | 10-2017-0040240 A | 4/2017 |

OTHER PUBLICATIONS

International Search Report dated Nov. 26, 2019, issued in an International application No. PCT/KR2019/009653.
(Continued)

*Primary Examiner* — Angel T Brockman
(74) *Attorney, Agent, or Firm* — Jefferson IP Law, LLP

(57) ABSTRACT

An electronic device is provided. The electronic device includes a communication module supporting communication based on Bluetooth Low Energy (BLE), and a processor operatively coupled to the communication module. The processor is configured to transmit control information to request the communication module to operate in a first mode. Upon receiving an advertising Packet Data Unit (PDU) of predefined types from an external electronic device, the first mode corresponds to a mode of controlling the communication module so that a scan request is transmitted to the external electronic device in response to reception of the advertising PDU of the predefined types. The communication module is configured to receive the advertising PDU from the external electronic device, while operating in the first mode, on the basis of the control information, identify that a type of the received advertising PDU corresponds to a first type distinct from the predefined types, on the basis of a header included in the received advertising PDU, bypass transmission of the scan request on the basis of the identifying, and transmit to the processor an
(Continued)

advertising notification for representing that the advertising PDU of the first type has been received.

22 Claims, 11 Drawing Sheets

(51) Int. Cl.
    *H04W 4/80*     (2018.01)
    *H04W 72/04*     (2009.01)
    *H04B 17/318*     (2015.01)
    *H04W 80/02*     (2009.01)

(52) U.S. Cl.
    CPC ......... *H04W 8/26* (2013.01); *H04W 72/0413* (2013.01); *H04W 80/02* (2013.01)

(58) Field of Classification Search
    USPC ........................................................ 370/329
    See application file for complete search history.

(56) References Cited

U.S. PATENT DOCUMENTS

| | | |
|---|---|---|
| 9,648,518 B2 | 5/2017 | Chen et al. |
| 9,699,593 B2 | 7/2017 | Viswanadham et al. |
| 2015/0319600 A1 | 11/2015 | Kanaappila |
| 2017/0026777 A1 | 1/2017 | Denboer et al. |
| 2017/0223579 A1 | 8/2017 | Lee et al. |
| 2017/0223615 A1 | 8/2017 | Lee et al. |
| 2018/0098338 A1 | 4/2018 | Choi et al. |

OTHER PUBLICATIONS

Core System Package [Low Energy Controller volume]; Bluetooth SIG, Dec. 6, 2016.
Extended European Search Report dated Apr. 20, 2021, issued in European Patent Application No. 19846791.2-1213.

APPARATUS AND METHOD FOR COMMUNICATING BY USING BLUETOOTH LOW ENERGY

CROSS-REFERENCE TO RELATED APPLICATION(S)

This application is based on and claims priority under 35 U.S.C. § 119 of a Korean patent application number 10-2018-0092713, filed on Aug. 8, 2018, in the Korean Intellectual Property Office, the disclosure of which is incorporated by reference herein in its entirety.

BACKGROUND

1. Field

The disclosure relates to an apparatus and method for performing communication by using Bluetooth low energy (BLE).

2. Description of Related Art

An electronic device may provide various functions. For example, the electronic device may perform not only data transmission/reception using a mobile communication network but also short-range wireless communication including Bluetooth low energy (BLE). In addition, with the development of the short-range wireless communication, the electronic device may perform communication by using Bluetooth low energy to decrease power consumption.

The above information is presented as background information only to assist with an understanding of the disclosure. No determination has been made, and no assertion is made, as to whether any of the above might be applicable as prior art with regard to the disclosure.

SUMMARY

An electronic device may transmit/receive data with respect to an external electronic device on the basis of Bluetooth low energy. If a plurality of electronic devices and a plurality of external electronic devices are present within coverage for performing communication based on Bluetooth Low Energy (BLE), interference may occur between signals for a BLE connection, which may cause a failure in a search and connection of the external electronic device. Therefore, a method for decreasing the failure in the search and connection of the external electronic device may be required in the presence of the plurality of electronic devices or the plurality of external electronic devices.

Aspects of the disclosure are to address at least the above-mentioned problems and/or disadvantages and to provide at least the advantages described below. Accordingly, an aspect of the disclosure is to provide an apparatus and method for performing communication by using Bluetooth low energy (BLE).

Additional aspects will be set forth in part in the description which follows and, in part, will be apparent from the description, or may be learned by practice of the presented embodiments.

In accordance with an aspect of the disclosure, an electronic device is provided. The electronic device includes a communication module to support communication based on Bluetooth Low Energy (BLE), and at least one processor operatively coupled to the communication module. The at least one processor may be configured to transmit control information to request the communication module to operate in a first mode. Upon receiving an advertising Packet Data Unit (PDU) of predefined types from an external electronic device, the first mode may correspond to a mode of controlling the communication module so that a scan request is transmitted to the external electronic device in response to reception of the advertising PDU of the predefined types. The communication module may be configured to receive the advertising PDU from the external electronic device, while operating in the first mode, on the basis of the control information, identify that a type of the received advertising PDU corresponds to a first type distinct from the predefined types, on the basis of a header included in the received advertising PDU, bypass transmission of the scan request on the basis of the identifying, and transmit to the at least one processor an advertising notification for representing that the advertising PDU of the first type has been received.

In accordance with another aspect of the disclosure, an electronic device is provided. The electronic device includes a user interface, a wireless communication circuit configured to support BLE wireless communication, and upon receiving an advertising PDU of a predefined type from an external electronic device, to request the external electronic device for additional information, and at least one processor operatively coupled to the user interface and the wireless communication circuit. The wireless communication circuit may be configured to receive the advertising PDU including a header and a payload from the external electronic device, identify a type of the advertising PDU included in the header of the advertising PDU, identify a data type included in the payload of the advertising PDU, and transmit an advertising notification to the at least one processor on the basis of data included in the advertising in a state of not transmitting the additional information request to the external electronic device, based on the identified type of the advertising PDU being the predefined type and if at least one of the data types includes a selected identifier.

In accordance with another aspect of the disclosure, an electronic device is provided. The electronic device includes a user interface, a wireless communication circuit configured to support BLE wireless communication and to receive an advertising PDU including a header including a field indicating a type of an advertising PDU from an external electronic device, and at least one processor operatively coupled to the user interface and the wireless communication circuit. The wireless communication circuit may be configured to receive, from an external electronic device, an advertising PDU not including information on the electronic device, identify that a type of the advertising PDU included in a header of the advertising PDU is a first type, and transmit to the at least one processor an advertising notification on the basis of data included in the advertising in a state of not transmitting the additional information request to the external electronic device on the basis of the first type.

An apparatus and method according to various embodiments of the disclosure can decrease a failure in a device search and/or connection by defining a new type of an advertiser Packet Data Unit (PDU).

An apparatus and method according to various embodiments of the disclosure can decrease interference of a scan request and connection request by bypassing transmission of the scan request for advertising received based on active scanning.

An apparatus and method according to various embodiments of the disclosure can improve search and connection functions of an advertiser in producing, manufacturing, and verifying processes in which a plurality of advertiser and scanners coexist.

An apparatus and method according to various embodiments can decrease power consumption and time consumed in scanning for a Bluetooth low power energy connection.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
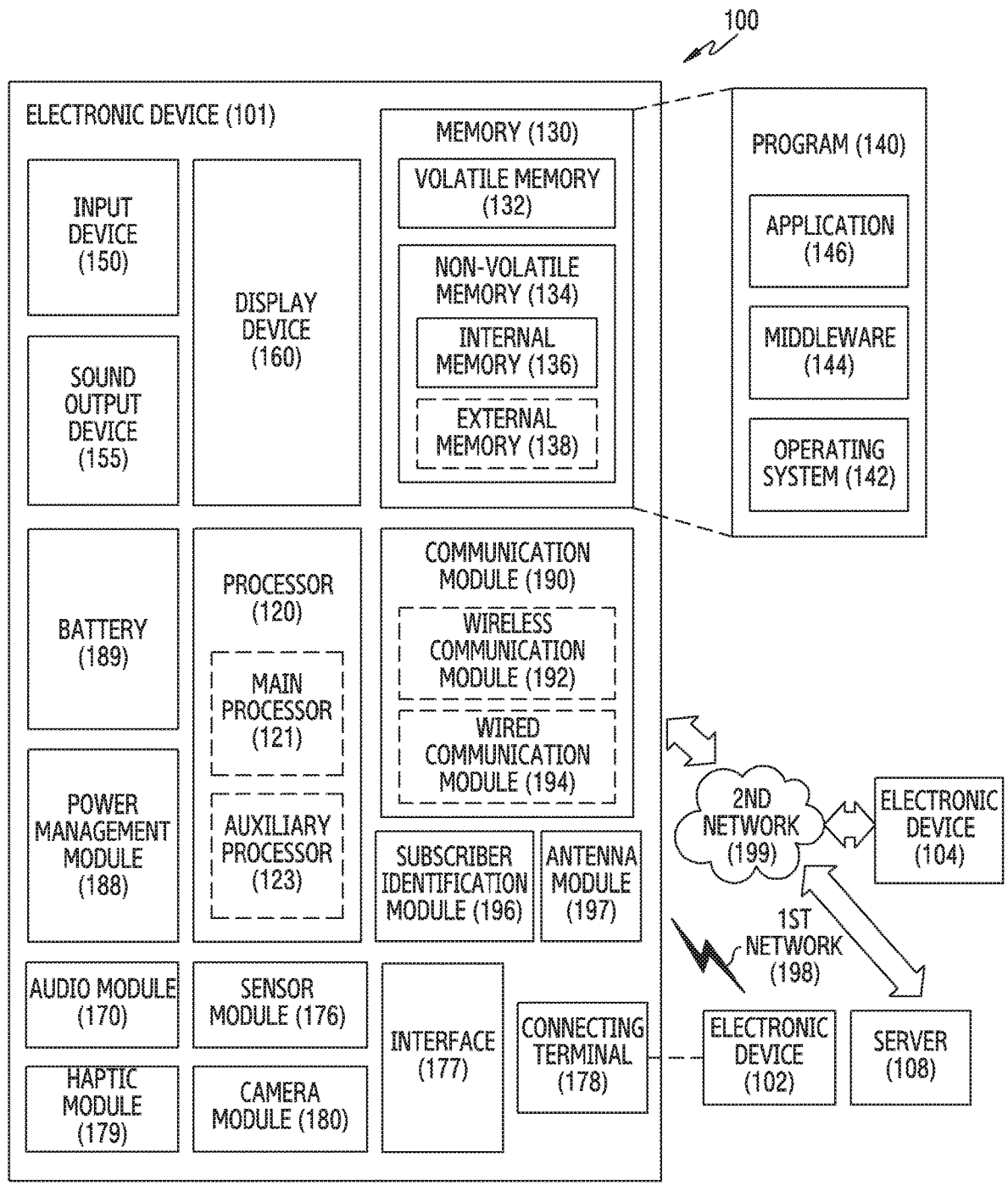
FIG. 1 is a block diagram of an electronic device in a network environment according to various embodiments of the disclosure.

FIG. 1 is a block diagram illustrating an electronic device 101 in a network environment 100 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g., a transceiver), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
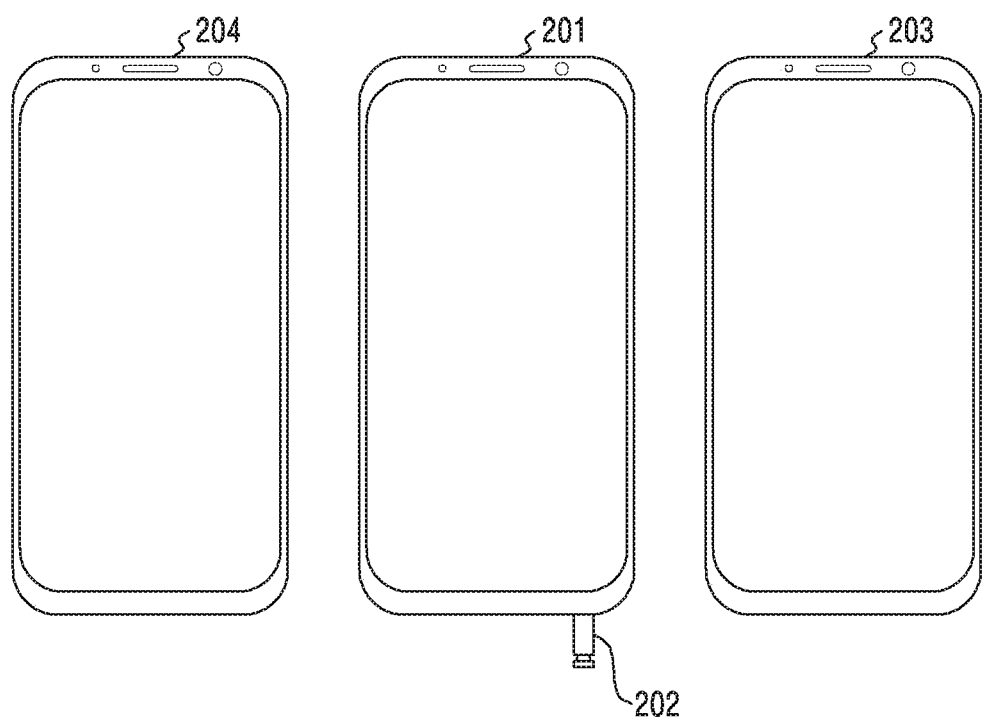
FIG. 2 illustrates an operating environment of an electronic device according to various embodiments of the disclosure.

FIG. 2 illustrates an operating environment of an electronic device according to various embodiments of the disclosure.

According to various embodiments, an electronic device 201 of FIG. 2 may correspond to the electronic device 101 of FIG. 1.

Referring to FIG. 2, the operating environment may include the electronic device 201, an external electronic device 202, a second electronic device 203, and a third electronic device 204.

According to various embodiments, the electronic device 201 may establish a connection with the external electronic device 202. For example, the electronic device 201 may establish the connection with the external electronic device 202 by using Bluetooth Low Energy (hereinafter, BLE). In an embodiment, if the electronic device 201 and the external electronic device 202 establish a communication connection on the basis of the BLE, the electronic device 201 may operate as a scanner or a master. The scanner may refer to a role of the electronic device 201 before the connection using the BLE is established. The master may refer to a role of the electronic device 201 after the connection using the BLE is established. According to various embodiments, each of a plurality of electronic devices (e.g., the electronic device 201, the second electronic device 203, and the third electronic device 204) may operate as one of the scanner and the master depending on a connection state of the BLE.

According to various embodiments, the external electronic device 202 may establish the connection with the electronic device 201. For example, the external electronic device 202 may establish the connection on the basis of the BLE. In an embodiment, if the electronic device 201 and the external electronic device 202 establish the communication connection on the basis of the BLE, the external electronic device 202 may operate as an advertiser or a slave. The advertiser may refer to a role of the external electronic device 202 before the connection using the BLE is established. The slave may refer to a role of the external electronic device 202 after the connection using the BLE is established.

According to an embodiment, the external electronic device 202 may be mounted inside the electronic device 201. For example, the external electronic device 202 may be mounted to at least part of a housing (not shown) of the electronic device 201. At least part of the housing (not shown) may include a shielding member for a waterproof structure. According to various embodiments, the external electronic device 202 may be referred to as various terminologies including an electronic pen or a stylus pen.

In various embodiments, the second electronic device 203 and the third electronic device 204 may receive a signal from the external electronic device 202. For example, the second electronic device 203 and the third electronic device 204 may be included in the coverage of a signal for the BLE connection. Although not shown, each of the second electronic device 203 and the third electronic device 204 may include the external electronic device (e.g., the electronic pen or the stylus pen). For example, the second electronic device 203 may include a second external electronic device (not shown) configured to be coupled to the second electronic device 203. For another example, the third electronic device 204 may include a third external electronic device (not shown) configured to be coupled to the third electronic device 204. The second external electronic device (not shown) may be configured to be paired with the second electronic device 203. The third external electronic device (not shown) may be configured to be paired with the third electronic device 204.

Figure 3:
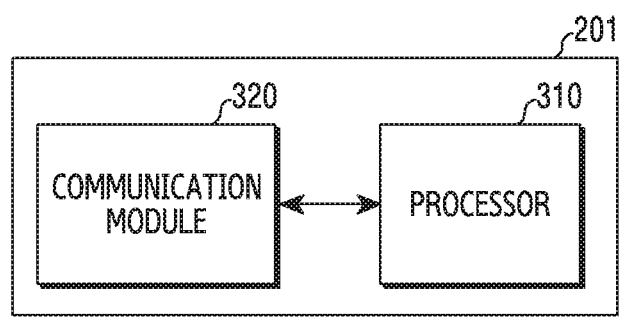
FIG. 3 is a block diagram illustrating a functional structure of the electronic device 201 according to various embodiments of the disclosure.

FIG. 3 is a block diagram illustrating a functional structure of the electronic device 201 according to various embodiments of the disclosure.

Referring to FIG. 3, according to various embodiments, the electronic device 201 may include a processor 310 (e.g., the processor 120 of FIG. 1) and a communication module 320 (e.g., the communication module 190 of FIG. 1).

The processor 310 may provide overall control to the electronic device 201. The processor 310 may perform communication with the external electronic device 202 by using the communication module 320. The processor 310 may transmit data to the external electronic device 202 or receive data from the external electronic device 202 by using the communication module 320.

According to an embodiment, the processor 310 may control the communication module 320. The processor 310 may transmit control information indicating an operating mode to the communication module 320. The operating mode may indicate whether to perform an operation of transmitting a request for additional information to the external electronic device 202, in response to reception of an advertising packet. For example, the processor 310 may transmit control information instructing the communication module 320 to operate in a first mode for an active scan. The active scan may refer to a mode in which the electronic device 201 receives the advertising packet from the external electronic device 202 and performs a request for additional data to the external electronic device 202. The active scan may refer to a mode configured such that the electronic device 201 receives the advertising packet from the external electronic device 202, bypasses transmission of an advertising notification to the processor 310 in response to the reception, and transmits the request for additional data to the external electronic device 202. The additional data may include a scan response transmitted to the external electronic device 202 or a scan response received from the external electronic device 202.

A passive scan may refer to a mode in which the electronic device 201 only receives an advertising packet from the external electronic device 202, and does not request for additional data. The passive scan may refer to a mode configured such that the electronic device 201 receives the advertising packet from the external electronic device 202, and transmits an advertising notification to the processor 310 in response to the reception.

Referring to FIG. 3, although it is illustrated that the processor 310 and the communication module 320 are distinguishable with a separate configuration and are operatively coupled, the disclosure is not limited thereto. According to various embodiments, the processor 310 may be implemented to be integrated with the communication module 320 as one chip.

Figure 4:
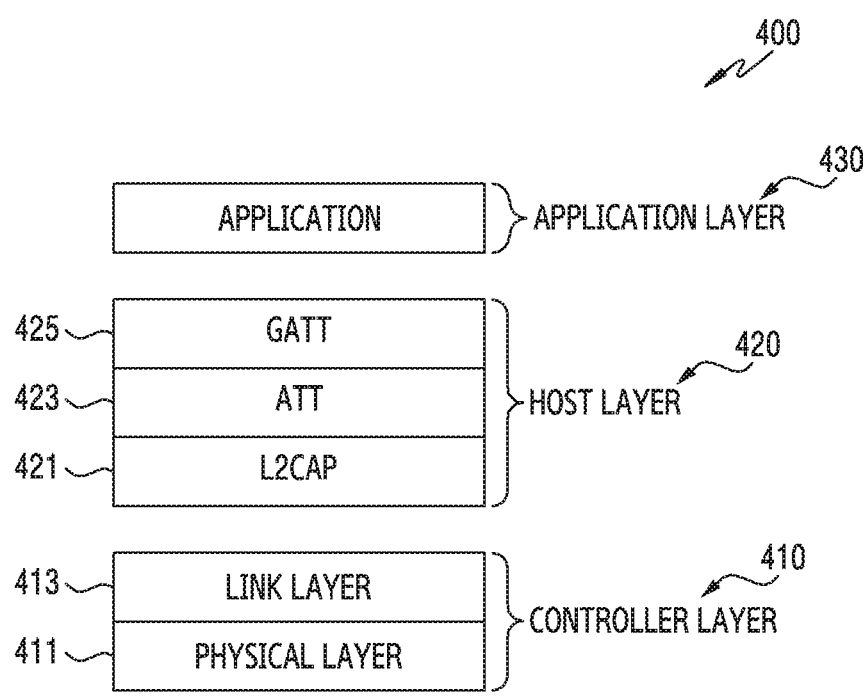
FIG. 4 illustrates a Bluetooth protocol stack according to various embodiments of the disclosure.

FIG. 4 illustrates a Bluetooth protocol stack according to various embodiments of the disclosure.

A Bluetooth protocol stack 400 of FIG. 4 may include a controller layer 410, a host layer 420, and an application layer 430.

Referring to FIG. 4, the controller layer 410 may generate a packet and perform transmission/reception of the generated packet. The controller layer 410 may include a physical layer 411 and a link layer 413.

The physical layer 411 may divide a frequency band of 2.4 GHz into 40 channels, and may transmit/receive a packet by using the 40 channels. For example, the physical layer 411 may receive an advertising packet via an advertising channel. The advertising channel may correspond to one of channels #37, #38, and #39. A center frequency of the channel #37 may correspond to 2402 MHz, a center frequency of the channel #38 may correspond to 2426 MHz, and a center frequency of the channel #39 may correspond to 2480 MHz. For another example, the physical layer 411 may transmit/receive a data packet with respect to the external electronic device 202 via a data channel. The data channel may refer to a channel for transmitting/receiving a packet after a connection is established between the electronic device 201 and the external electronic device 202. The data channel may include 37 channels, i.e., the channel #0 to the channel #36.

The link layer 413 may perform hardware and software processes. The hardware process may include a plurality of hardware processes including a process for Cyclic Redundancy Check (CRC) generation or packet verification using CRC and a process for generating a preamble or an access address value. The software process may include processes related to a connection state with respect to the external electronic device 202. For example, the software process may define a role of the electronic device 201 and the external electronic device 202. For another example, the software process may change an operating state of the electronic device 201. The link layer 413 may change the operating state of the communication module 320 from a standby state to a scan state on the basis of control information received from the processor 310. The electronic device 201 may listen an advertising packet from the external electronic device 202 on the basis of the changed scan state.

In various embodiments, the host layer 420 may perform a logic operation for performing Bluetooth communication. The host layer 420 may at least include a Logical Link Control and Adaptation Protocol (L2CAP) 421, a Security Manager Protocol (SMP) (not shown), an ATTribute protocol (ATT) 423, a Generic ATTribute profile (GATT) 425, and a Generic Access Profile (GAP) (not shown).

The L2CAP 421 may provide a service for data security. For example, the L2CAP may perform encapsulation of a packet. The SMP (not shown) may provide the connection and data transmission/reception between the electronic device 201 and the external electronic device 202. The ATT 423 may provide a profile for using a service of the external electronic device 202. The GATT 524 may perform a function of the service of the external electronic device 202, acquired from the ATT. The GAP (not shown) may provide an interface between the electronic device 201 and the external electronic device 202 by using paring and boding.

The application layer 430 may include an application using communication based on the BLE. For example, a first application of the application layer 430 may request the communication 320 to operate in a first mode for an active scan. For another example, a second application of the application layer 430 may request the communication module 320 to operate in a second mode for a passive scan. If at least one application among a plurality of applications included in the application layer 430 requests for the first mode for the active scan, the application layer 430 may transmit control information instructing the communication module 320 to operate in the first mode for the active scan. According to various embodiments, the application layer 430 may receive a scan response via the controller layer 410, and may transmit control information to the controller layer 410 to request for a BLE connection with the external electronic device 202 on the basis of the received scan response. The controller layer 410 may transmit a connection initiation (e.g., CONNECT_REQ) to the external electronic device 202 on the basis of the control information.

Figure 5:
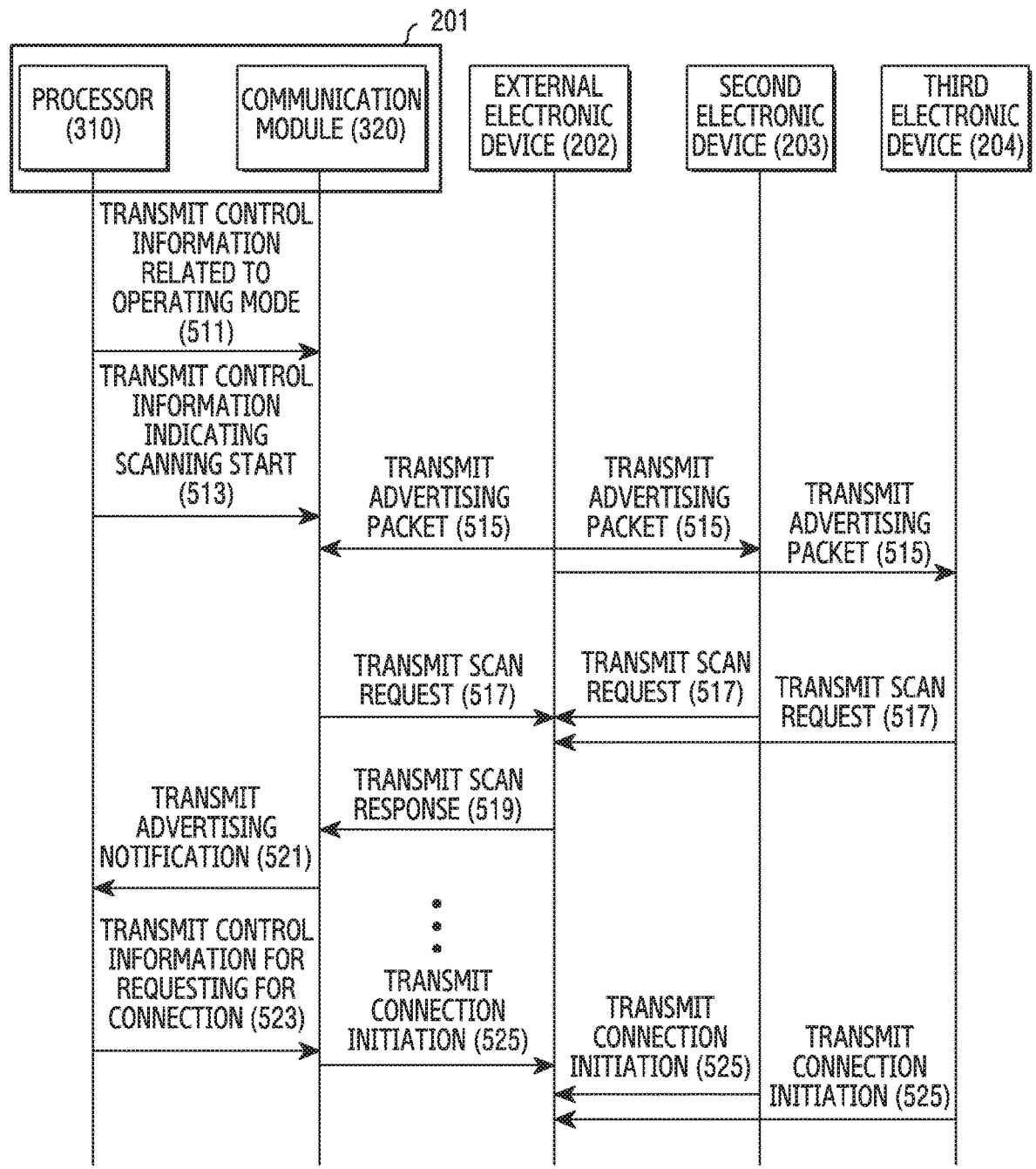
FIG. 5 illustrates a signal exchange for a Bluetooth Low Energy (BLE)-based communication connection of an electronic device according to various embodiments of the disclosure.

FIG. 5 illustrates a signal exchange for a BLE-based communication connection of the electronic device 201 according to various embodiments of the disclosure.

Referring to FIG. 5, a signal exchange between a processor 301 and a communication module 320 may be an exchange of a signal generated inside the electronic device 201. A signal exchange performed among the electronic device 201, the external electronic device 202, the second electronic device 203, and the third electronic device 204 may be an exchange of a signal generated via On The Air (OTA).

According to various embodiments, in operation 511, the processor 310 transmit control information related to an operating mode to the communication module 320. The processor 310 may transmit control information indicating one of a first mode for an active scan and a second mode for a passive scan to the communication module 320. The first mode for the active scan may correspond to a mode configured to transmit to the external electronic device 202 a signal for requesting for additional information, in response to reception of an advertising PDU of a predefined type from the external electronic device 202. The second mode for the passive scan may correspond to a mode configured to receive the advertising PDU of the predefined type from the external electronic device 202 and not to transmit to the external electronic device 202 the signal for requesting for the additional information. The signal for requesting for the additional information may include a scan request. The predefined type may include an ADV_IND type or an ADV_SCAN_IND type among the types of the advertising PDU. According to an embodiment, the control information may be transmitted from the processor 310 to the communication module 320 through a Host Controller Interface (HCI). The HCI may refer to an interface for providing transmission/reception of control information including instructions or commands between the communication module 320 and the processor 310.

According to an embodiment, if at least one application among the plurality of applications of the application layer 430 requests to operate in the first mode for the active scan, the processor 310 may transmit control information indicating the first mode to the communication module 320. The control information related to the operating mode may also be referred to as LE_SET_SCAN_PARAMETERS. The communication module 320 may receive the control information, and may change network parameters for performing the active scan through the first mode. Although not shown, the communication module 320 may transmit information indicating that the operating mode has completely changed to the processor 310, in response to reception of the control information.

According to various embodiments, although it is described that the processor 310 transmits the control information to the communication module 320 on the basis of the request of the at least one application among the plurality of applications of the application layer 430 to operate in the first mode for the active scan, the disclosure is not limited thereto. For example, the host layer 420 may transmit the control information such that the communication module 320 (e.g., the controller layer 410) operates in the first mode regardless of the operating mode requested by the plurality of applications of the application layer 430.

According to various embodiments, in operation 513, the processor 310 may transmit control information indicating a scanning start to the communication module 320. The communication module 320 may operate in a standby state before receiving the control information indicating the scanning start. The standby state may correspond to a state in which the communication module 320 does not transmit/receive a packet. The processor 310 may change a state of the communication module 320 from the standby state to the scanning state by transmitting control information indicating the scanning. The scanning state may refer to a state in which the communication module 320 listens an advertising packet or a scan response. Although not shown, the communication module 320 may transmit information indicating that the state of the communication module 320 has completely changed to the scanning state to the processor 310, in response to the control information indicating the scanning start.

According to various embodiments, in operation 515, the external electronic device 202 may transmit an advertising packet. The external electronic device 202 may broadcast the advertising packet to a plurality of electronic devices located within a coverage area for the BLE. The plurality of electronic devices may include, for example, the electronic device 201, the second electronic device 203, or the third electronic device 204.

According to an embodiment, the communication module 320 of the electronic device 201 may receive the advertising packet transmitted from the external electronic device 202 by performing scanning while operating in the scanning state. The communication module 320 may receive the advertising packet via a predetermined advertising channel. For example, the communication module 320 may receive the advertising packet from the external electronic device 202 while performing frequency hopping according to a predetermine rule via one channel among a channel #37, a channel #38, and a channel #39.

According to various embodiments, in operation 517, the plurality of electronic devices may respectively transmit scan requests to the external electronic device 202, in response to reception of the advertising packet. For example, the external electronic device 202 may respectively receive the scan requests from the plurality of electronic devices. According to an embodiment, the advertising packet which is broadcast from the external electronic device 202 may be received in the plurality of electronic devices substantially at the same time. The plurality of electronic devices, for example, the electronic device 201, the second electronic device 203, and the third electronic device 204, may wait for a designated time interval in response to reception of the advertising packet. The designated time interval may refer to a minimum wait time required when the communication module 320 transmits a scan request to the external electronic device 202 in response to reception of the advertising packet. The designated time interval may be 150 µs.

According to various embodiments, in operation 517, the external electronic device 202 may receive scan requests respectively from the plurality of electronic devices. The plurality of electronic devices, for example, the electronic device 201, the second electronic device 203, and the third electronic device 204, may receive the advertising packets, which are broadcast from the external electronic device 202, substantially at the same time, and may transmit each of the scan requests to the external electronic device 202 after the designated time interval. The plurality of electronic devices may respectively transmit the scan requests to the external electronic device 202 via one of the three advertising channels (e.g., the channel #37, the channel #38, and the channel #39).

According to various embodiments, in operation 517, the external electronic device 202 may receive the scan requests respectively from the plurality of electronic devices (e.g., the electronic device 201, the second electronic device 203, or the third electronic device 204) which have received the advertising packet. The scan request may be referred to as SCAN_REQ. The advertising packet transmitted by the external electronic device 202 corresponds to an undirected attribute, and thus may be transmitted to the plurality of electronic devices located within a BLE coverage. The plurality of electronic devices may respectively transmit the scan requests in response to reception of the advertising packet.

According to an embodiment, each of the scan requests (e.g., operation 517) transmitted from the plurality of electronic devices to the external electronic device 202 may act as a collision. The external electronic device 202 may receive each of the scan requests substantially at the same time after the designated time interval from a time point at which the advertising packet is broadcast in operation 515. For example, a time interval until the plurality of electronic devices receive the advertising packet and transmit the respective scan requests may be substantially identical. The time interval may correspond to a predetermined value (e.g., 150 µs). The scan requests received via the same advertising channel may act as interferences to each other. For example, the plurality of electronic devices (e.g., the electronic device 201, the second electronic device 203, and the third electronic device 204) may transmit the respective scan requests via the channel #37. The interference which may occur between the scan requests transmitted from the plurality of electronic devices at the substantially same time may interrupt the external electronic device 202 from successfully receiving the scan request transmitted from the electronic device 201.

According to various embodiments, in operation 519, the external electronic device 202 may transmit a scan response to the electronic device 201. The scan response may include transmission of an advertising PDU of an SCAN_RSP type. According to an embodiment, if the external electronic device 202 successfully receives the scan request transmitted from the electronic device 201, the external electronic device 202 may transmit the scan response to the electronic device 201 which has transmitted the scan request. The scan response may include address information and data information of the external electronic device 202.

Although not shown, in operation 515, the communication module 320 may receive the advertising packet while operating in the second mode for the passive scan. The communication module 320 may be configured to transmit an advertising notification to the processor 310 upon receiving the advertising packet while operating in the second mode. The advertising notification may include a device address and advertising data of the external electronic device 202. The communication module 320 operating in the second mode may receive the advertising packet, and may transmit the advertising notification to the processor 310 without having to perform operation 517 for transmitting the scan request to the external electronic device 202 and operation 519 for receiving the scan response from the external electronic device 202.

According to various embodiments, in operation 521, the communication module 320 of the electronic device 201 may transmit the advertising notification to the processor 310. The communication module 320 may receive the scan response from the external electronic device 202 while operating in the first mode for the active scan. The communication module 320 may transmit the advertising notification to the processor 310 upon receiving the scan response while operating in the first mode for the active scan. The advertising notification may include a device address of the external electronic device 202 and data included in the scan response.

According to various embodiments, in operation 523, the processor 310 of the electronic device 201 may transmit, to the communication module 320, control information for requesting for a connection with the external electronic device 202. For example, upon receiving a user input (e.g., a touch of an object displayed on a display as SYNC) for data synchronization with the external electronic device 202, the processor 310 may instruct the communication module 320 to transmit the connection initiation.

According to various embodiments, in operation 525, the communication module 320 may transmit the connection initiation to the external electronic device 202 on the basis of the request. According to various embodiments, the connection initiation may include a PDU of a CONNECT_REQ type.

According to various embodiments, the external electronic device 202 may simultaneously receive the connection initiation transmitted by the electronic device 201 and the scan request transmitted by other electronic devices (e.g., the second electronic device 203 or the third electronic device 204). According to an embodiment, in operation 519, the external electronic device 202 may transmit the scan response. The electronic device 201 may receive the transmitted scan response and may transmit the connection initiation. Each of the second electronic device 203 and the third electronic device 204 may transmit the scan request. Therefore, the connection initiation transmitted from the electronic device 201 and the scan request transmitted from each of the second electronic device 203 and the third electronic device 204 may cause interference to each other. Due to the interference, the external electronic device 202 may fail to receive the connection initiation transmitted from the electronic device 201.

Although not shown, operations 515 to 519 may be performed repeatedly. According to an embodiment, the electronic device 201 may transmit the scan request repeatedly according to a predefined rule. The predefined rule may be determined based on a backoff algorithm related to the scan request. For example, after transmitting the scan request, the electronic device 201 may retransmit the scan request as soon as a time elapses at which the scan response is expected to be received. For another example, after receiving the scan request, if the scan request is not received, the electronic device 201 may transmit the scan request after the predetermined time interval elapses. The backoff algorithm may be determined as any count by an operator or a manufacturer. Although the backoff algorithm is described in association with the scan request in the embodiment, the disclosure is not limited thereto. In various embodiments, the backoff algorithm may be applied to the advertising packet transmitted by the external electronic device 202 in operation 515 and the scan response transmitted by the external electronic device 202.

According to various embodiments, the type of the advertising PDU may also be defined based on a plurality of attributes. The plurality of attributes may include an attribute related to transmission of the scan request, an attribute related to transmission of a connection initiation, and an attribute related to a presence/absence of a target device. According to an embodiment, the attribute related to transmission of the scan request may be classified into a scannable attribute and a non-scannable attribute. For example, the scannable attribute may indicate that an electronic device (e.g., the electronic device 201) which has received the advertising PDU can transmit the scan request to a counterpart electronic device which has transmitted the advertising PDU in response to the reception. For another example, the non-scannable attribute may indicate that the electronic device (e.g., the electronic device 201) cannot receive the scan request to the counterpart electronic device in response to the reception. According to another embodiment, the attribute related to transmission of the connection initiation may be classified into a connectable attribute and a non-connectable attribute. For example, the connectable attribute may indicate that the electronic device (e.g., the electronic device 201) can transmit the connection initiation to establish a Bluetooth connection to a counterpart electronic device which has transmitted the advertising PDU. For another example, the non-connectable attribute may indicate that an electronic device which has received the advertising PDU cannot transmit the connection initiation for the Bluetooth connection to the counterpart electronic device which has transmitted to the advertising PDU. According to another embodiment, the attribute related to the presence/absence of the target device may be classified into a direct attribute and an undirect attribute. For example, the direct attribute may indicate that the electronic device (e.g., the external electronic device 202) for transmitting the advertising PDU has transmitted the advertising PDU by including Bluetooth address information of the target device (e.g., the electronic device 201) for receiving the advertising PDU. For another example, the undirect attribute may indicate that the electronic device for transmitting the advertising PDU has transmitted the advertising PDU without the information on the target device for receiving the adverting PDU. Accordingly, the electronic device which has received the advertising PDU of the direct attribute may decide whether the target device's address information included in the advertising PDU coincides with address information of the electronic device which has received the advertising PDU.

Figure 6:
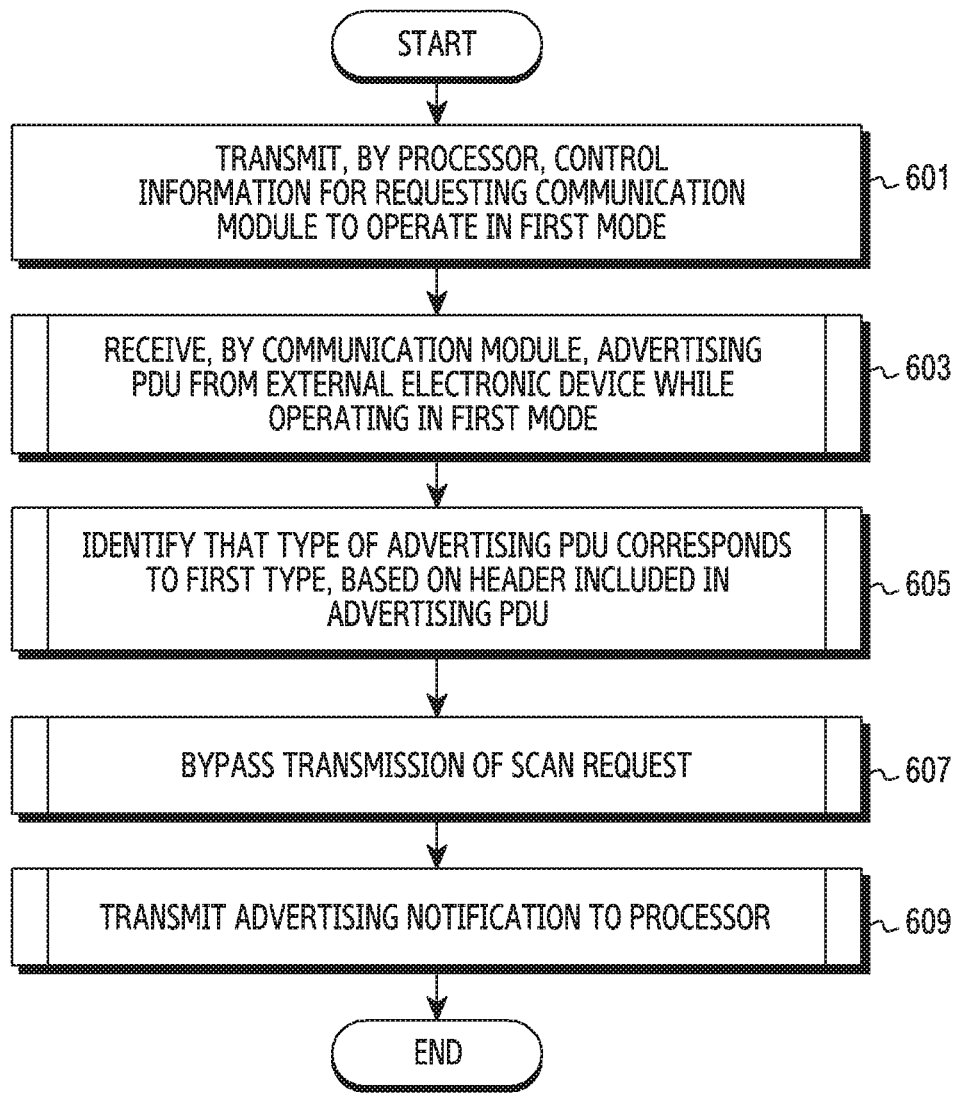
FIG. 6 illustrates an operation of an electronic device according to various embodiments of the disclosure.

FIG. 6 illustrates an operation of the electronic device 201 according to various embodiments of the disclosure.

Referring to FIG. 6, in operation 601, the processor 310 may transmit control information for requesting the communication module 320 to operate in a first mode. For example, the processor 310 may receive information for requesting the communication module 320 to operate in an active scan from at least one application among a plurality of applications. The processor 310 may transmit the control information for requesting the communication module 320 to operate in the first mode, on the basis of the received information. The first mode may correspond to a mode in which the communication module is controlled to transmit a scan request to the external electronic device 202, upon receiving an advertising PDU of predefined types from the external electronic device 202, in response to reception of the advertising PDU of the predefined types. The predefined types may include an ADV_IND type and an ADV_SCAN_IND type among advertising PDU's types defined in the BLE standard.

According to various embodiments, the control information may correspond to control information related to the operating mode of FIG. 5. The communication module 320 may set the operating mode of the communication module 320 to the first mode on the basis of the control information received from the processor 310. A state of the communication module 320 at a time at which the control information is received may correspond to a standby state. The communication module 320 may change the operating state from the standby state to a scan state on the basis of the control information.

In operation 603, the communication module 320 may receive the advertising PDU from the external electronic device 202 while operating in the first mode. The advertising PDU may refer to a PDU field of an advertising type among advertising packets transmitted from the external electronic device 202. The advertising packet may include an advertising PDU or a scanning PDU. The advertising PDU may refer to a PDU field of an advertising packet in which a PDU_Type field indicates one of an ADV_IND type, an ADV_DIRECT_IND type, an ADV_NONCONN_IND type, and an ADV_SCAN_IND type. The scanning PDU may refer to a PDU field of an advertising packet in which a PDU_Type field indicates one of a SCAN_REQ type and a SCAN_RSP type.

In operation 605, the communication module 320 may identify that a type of the advertising PDU corresponds to a first type on the basis of a header included in the advertising PDU. The first type may correspond to a newly defined type distinct from the types defined in the BLE standard. According to an embodiment, the advertising PDU may include a header and a payload, and the header may include a PDU_Type field. The PDU_Type field may include information indicating the type of the advertising PDU. The communication module 320 may acquire information indicating the type of the received advertising PDU by decoding information included in the PDU_Type field.

According to various embodiments, the types of the advertising PDU may include the first type and the predefined types. The predefined types may include the ADV_IND type, ADV_SCAN_IND type, ADV_NONCONN_IND type, or ADV_DIRECT_IND type defined in the BLE standard. According to an embodiment, the communication module 320 may transmit a scan request to the external electronic device 202 in response to reception of the advertising packet including the advertising PDU of the ADV_IND type or the ADV_SCAN_IND type. The scan request may include the advertising packet including a scanning PDU of a SCAN_REQ type. According to another embodiment, the communication module 320 may request the external electronic device 202 for a connection initiation, in response to reception of the advertising packet including the advertising PDU of the ADV_DIRECT_IND type. The connection initiation may include an advertising packet including an initiating PDU of a CONNECT_REQ type. The advertising PDU of the ADV_DIRECT_IND type may include address information (e.g., an AdvA field) of an advertiser and address information (e.g., an InitA field) of a scanner. If the scanner's address information included in the advertising PDU of the ADV_DIRECT_IND type coincides with the address information of the electronic device 201, the communication module 320 may request the external electronic device 202 for the connection initiation. According to another embodiment, the communication module 320 may receive the advertising packet including the advertising PDU of the ADV_NONCONN_IND type. Upon receiving the advertising packet including the advertising PDU of the ADV_NONCONN_IND type, the communication module 320 may not transmit a signal for the scan request or connection initiation to the external electronic device 202.

The second type may include the advertising PDU type indicating that the scan request can be transmitted to the external electronic device 202. For example, the second type may include ADV_IND and ADV_SCAN_IND. The communication module 320 may identify the advertising PDU type by decoding information included in the PDU_Type field included in a header of the advertising PDU. The communication module 320 may store a value indicating the first type in a memory (not shown) in advance, and may decide whether a value obtained by decoding the information included in the PDU_Type field coincides with a value indicating the first type. If the value indicating the first type coincides with the value obtained by decoding the information included in the PDU_Type field, the communication module 320 may determine that the type of the received advertising PDU corresponds to the first type.

In operation 607, the communication module 320 may bypass transmission of the scan request. The communication module 320 may bypass the transmission of the scan request to the external electronic device 202 on the basis of the fact that the type of the received advertising PDU corresponds to the first type. According to an embodiment, by bypassing the transmission of the scan request, the communication module 320 can be prevented from transmitting a scan request at the same time with other scan requests to be transmitted to the external electronic device 202 from other electronic devices (e.g., the second electronic device 203 and the third electronic device 204).

In operation 609, the communication module 320 may transmit an advertising notification to the processor 310. The advertising notification may include control information for representing that the advertising PDU of the first type has been received. The communication module 320 may bypass transmission of the scan request and transmit the advertising notification to the processor 310, and thus may perform the same operation as in the second mode for a passive scan only for an advertising packet including the advertising PDU of the first type.

Figure 7:
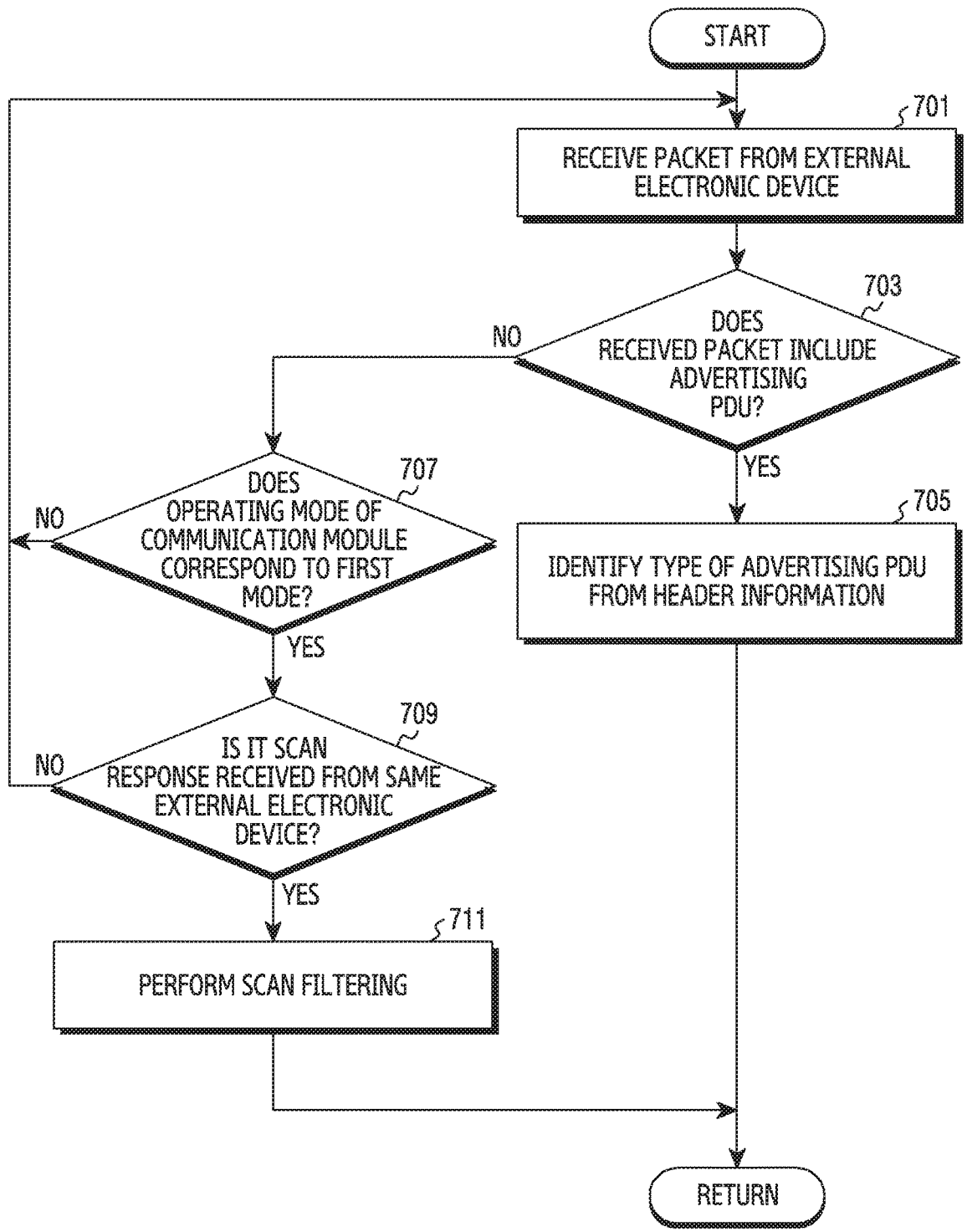
FIG. 7 illustrates an operation for receiving an advertising Packet Data Unit (PDU) according to various embodiments of the disclosure.

FIG. 7 illustrates an operation for receiving an advertising PDU according to various embodiments of the disclosure. FIG. 7 may include a detailed operation of the electronic device 201 for performing operations 603 and 605 of FIG. 6.

Referring to FIG. 7, in operation 701, the communication module 320 of the electronic device 201 may receive an advertising packet from the external electronic device 202. The advertising packet may include a preamble, an access address, a PDU, and a CRC. The preamble may be determined based on an LSB value of the access address. For example, if the LSB value is 1, the preamble may be determined to 01010101b. For another example, if the LSB value is not 1, the preamble may be determined to 10101010b. According to various embodiments, the communication module 320 may perform frequency synchronization on the basis of the preamble. The access address may indicate a packet type. If the packet is an advertising packet, it may correspond to a designated value (e.g., 0x8E89BED6 or 10001110100010011011111011010110b). If the packet is a data packet, the access address may be determined based on a connection state of the link layer 413. The PDU may include different data depending on the packet type. For example, a PDU included in the advertising packet (hereinafter, an advertising PDU) may include a header and a payload. The header may include data (e.g., a PDU_Type field) indicating a type of the advertising PDU. Data indicating the type of the advertising PDU may include 4 bits. The type of the advertising PDU may indicate one of an ADV_IND type (e.g., 0000), an ADV_DIRECT_IND type (e.g., 0001), an ADV_NONCONN_IND type (e.g., 0010), an ADV_SCAN_IND type (e.g., 0110), a SCAN_REQ type (e.g., 0011), a SCAN_RSP type (e.g., 0100), and a CONNECT_REQ type (e.g., 0101). The CRC may be used to identify packet integrity. The communication module 320 may use the CRC to identify whether the received packet coincides with a packet transmitted from the external electronic device 202.

In operation 703, the communication module 320 may determine whether the received advertising packet includes the advertising PDU. The communication module 320 may decide whether the received advertising packet corresponds to the advertising PDU by decoding a header included in the PDU of the received packet. According to an embodiment, the advertising packet may be classified into an advertising PDU or a scanning PDU. The advertising PDU refers to an advertising packet in which the PDU_Type field included in the header includes information indicating one of an ADV_IND type, an ADV_DIRECTED_IND type, an ADV_SCAN_IND type, and an ADV_NONCONN_IND type. The scanning PDU may refer to an advertising packet in which the PDU_Type field included in the header includes information indicating one of a SCAN_REQ type and a SCAN_RSP type. For example, if the PDU_Type field included in the header indicates one of an ADV_IND type, an ADV_DIRECTED_IND type, an ADV_SCAN_IND type, and an ADV_NONCONN_IND type, the communication module 320 may perform operation 705. For another example, if the PDU_Type field included in the header corresponds to one of the SCAN_REQ type and the SCAN_RSP type, since the PDU of the received advertising packet corresponds to the scanning PDU, the communication module 320 may perform operation 707.

In operation 705, the communication module 320 may acquire a type of the advertising PDU from header information included in the advertising PDU. The communication module 320 may acquire the type of the advertising PDU by referring to PDU_Type information included in the decoded header. The type of the advertising PDU may correspond to one of types of ADV_IND, ADV_DIRECTED_IND, ADV_SCAN_IND, ADV_NONCONN_IND or the first type.

In operation 707, the communication module 320 may identify whether the operating mode of the communication module 320 is the first mode. If the PDU_Type of the advertising packet is a scan response, the communication module 320 may identify the operating mode. For example, if the operating mode of the communication module 320 is set to the first mode for an active scan, since the scan response is received as in operation 519, operation 709 may be performed. For another example, if the operating mode of the communication module 320 is set to the second mode for a passive scan, the communication module 320 may transfer the received advertising packet to the host layer 420, and may delete the scan response. This is because, if the operating mode of the communication module 320 is set to the second mode, the communication module 320 is configured to transmit an advertising notification to the processor 310 without having to transmit the scan request to the external electronic device 202. Since the scan request has not be transmitted, upon receiving the scan response, the communication module 320 may determine that a wrong scan response is received, and thus may delete the received scan response.

In operation 709, the communication module 320 may decide whether the scan response is received from the same external electronic device 202. The communication module 320 may acquire an address of the external electronic device related to the received scan response by decoding the PDU included in the scan response. If an address of the external electronic device 202 which has transmitted the scan request is the same as the address of the external electronic device 202 related to the received scan response, the communication module 320 may determine that the scan response is received from the external electronic device which has transmitted the scan request. Upon receiving the scan response from the same device as the external electronic device which has transmitted the scan request, the communication module 320 may perform operation 711. Otherwise, if the address of the external electronic device 202 which has transmitted the scan request is different from the address of the external electronic device related to the scan response received from the electronic device 201, since the scan response is received from another external electronic device other than the external electronic device which has requested for the scan, the communication module 320 may discard the received advertising packet and may receive a new packet via an advertising channel.

In operation 711, the communication module 320 may perform scan filtering. The scan filtering may include filtering for selectively transmitting an advertising notification to the processor 310 upon receiving a scan response while the communication module 320 operates in the first mode for the active scan or upon receiving an advertising PDU while the communication module 320 operating in the second mode for the passive scan. According to various embodiments, the scan filtering may also be referred to as Advertising Packet Content Filtering (APCF).

Figure 8:
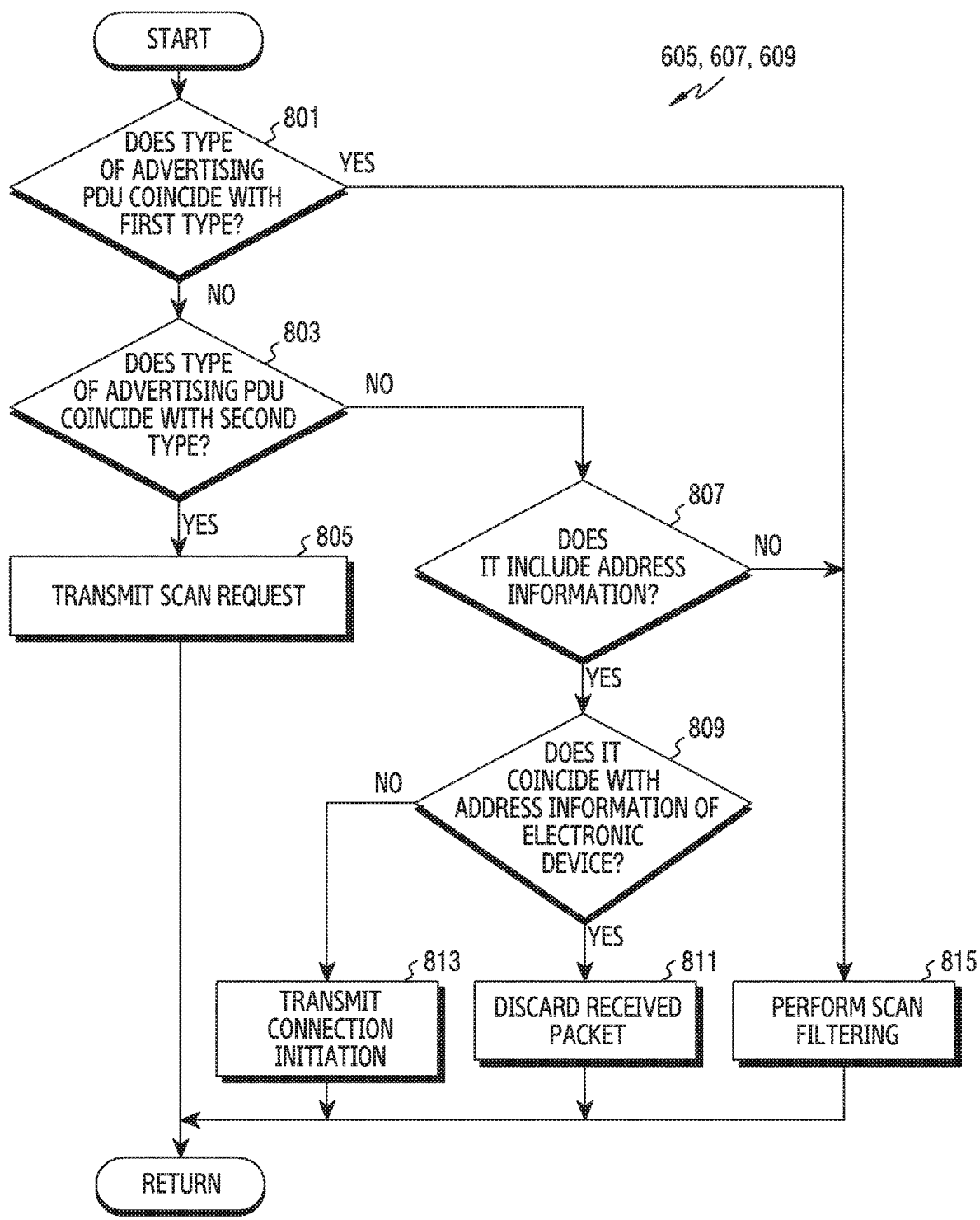
FIG. 8 illustrates an operation of processing an advertising packet on the basis of a first type according to various embodiments of the disclosure.

FIG. 8 illustrates an operation of processing an advertising packet on the basis of a first type according to various embodiments of the disclosure. FIG. 8 may include a detailed operation of the electronic device 201 for performing operations 605, 607, and 609.

Referring to FIG. 8, in operation 801, the communication module 320 of the electronic device 201 may decide whether a type of an advertising PDU coincides with the first type. The first type may refer to a type distinct from types defined in the BLE standard. For example, the first type may be expressed as an ADV_NONSCAN_IND type. The first type may have an UNDIRECTED attribute. An advertising packet including the advertising PDU of the first type may not include an address of a scanner device or master device. Upon receiving the advertising packet, the first type may correspond to a type configured to transmit only a connection initiation without having to transmit a scan request. If the type of the advertising PDU coincides with the first type, the communication module 320 may perform operation 815. Upon identifying that the type of the advertising PDU is different from the first type, the communication module 320 may perform operation 803.

In operation 803, the communication module 320 of the electronic device 201 may decide whether the type of the advertising PDU coincides with a second type. The second type may include at least one type among types of an advertising PDU defined in the BLE standard. The second type may include a type indicating that the electronic device 201 will transmit a scan request to the external electronic device 202, in response to reception of an advertising packet. For example, the second type may include an ADV_IND type or an ADV_SCAN_IND type. The communication module 320 may determine whether the type of the advertising PDU coincides with the second type, that is, whether the type of the advertising PDU corresponds to one of the ADV_IND type and the ADV_SCAN_IND type. If the type of the advertising PDU corresponds to one of the ADV_IND type and the ADV_SCAN_IND type, the communication module 320 may perform operation 805. Upon identifying that the type of the advertising PDU does not correspond to the ADV_IND type and the ADV_SCAN_IND type, the communication module 320 may perform operation 807.

In operation 805, the communication module 320 of the electronic device 201 may transmit a scan request. The communication module 320 may receive an advertising PDU while operating in the first mode. The communication module 320 may identify that the type of the received advertising PDU corresponds to one of types included in the second type. The communication module 320 may identify that the type of the received advertising PDU corresponds to the ADV_IND type or the ADV_SCAN_IND type, and may transmit the scan request to the external electronic device 202 on the basis of the first mode. In the first mode, upon receiving the advertising PDU of the ADV_IND type or the ADV_SCAN_IND type, the electronic device 201 may control the communication module 320 to transmit the scan request in order to request for additional information. The communication module 320 may transmit the scan request to the external electronic device 202, and may standby to receive a scan response.

In operation 807, the communication module 320 may determine whether a received advertising PDU includes address information. The address information may include address information on a scanner device or a master device. The address information may be included in an InitA field in the payload of the received advertising PDU. According to an embodiment, a type of the received advertising PDU may include the remaining types other than a type capable of transmitting a scan request among types predefined in the BLE standard. The type of the received advertising PDU may correspond to an ADV_DIRECT_IND type or an ADV_NONCONN_IND type. For example, upon identifying that the type of the received advertising PDU corresponds to the ADV_DIRECT_IND type, the communication module 320 may determine that the address information is included. Upon identifying that the received advertising PDU includes the address information, the communication module 320 may perform operation 809. For another example, if the type of the received advertising PDU corresponds to the ADV_NONCONN_IND type, the communication module 320 may determine that the address information is not included in the advertising PDU. Upon identifying that the received advertising PDU does not include the address information, the communication module 320 may perform operation 815.

In operation 809, the communication module 320 of the electronic device 201 may determine whether address information of the electronic device 201 coincides with an address included in the received advertising PDU. For example, the communication module 320 may acquire an address of a target device to which the external electronic device 202 intends to establish a connection, by decoding an InitA field in the payload included in the advertising PDU. The communication module 320 may determine whether the acquired address of the target device coincides with the address of the electronic device 201. For example, if the acquired address of the target device coincides with the address of the electronic device 201, the communication module 320 may perform operation 811. For another example, upon determining that the acquired address of the target device does not coincide with the address of the electronic device 201, the communication module 320 may perform operation 813.

In operation 811, the communication module 320 may transmit a connection initiation. For example, upon receiving an advertising PDU of an ADV_DIRECT_IND type, the communication module 320 may identify that address information included in the InitA field in the payload coincides with address information of the electronic device 201. The communication module 320 may transmit a signal for requesting for a connection to the external electronic device 202 on the basis of the identification. The signal for requesting for the connection may include a connection initiation signal. The connection initiation signal may include a PDU of a CONNECT_REQ type.

In operation 813, the communication module 320 may discard the received packet. The communication module 320 may receive an advertising PDU of an ADV_DIRECT_IND type, and may acquire an address of a target device on the basis of the InitA field in the payload of the advertising PDU. If the acquired address information is different from the address information of the electronic device 201, the communication module 320 may determine that the packet is to be transmitted to any other electronic devices, and may discard an advertising packet including the advertising PDU.

In operation 815, the communication module 320 may perform scan filtering. The scan filtering may include filtering for selectively transmitting an advertising notification to the processor 310 upon receiving a scan response while the communication module 320 operates in the first mode for the active scan or upon receiving an advertising PDU while the communication module 320 operating in the second mode for the passive scan. According to various embodiments, the scan filtering may also be referred to as Advertising Packet Content Filtering (APCF). For example, the communication module 320 may not transmit the advertising notification, for all received packets, while operating in the second mode for the passive scan. The scan filtering may be configured to identify only an advertising packet conforming to a predefined filtering condition. The communication module 320 may transmit the advertising notification to the processor 310 only for the advertising packet conforming to the filtering condition.

Figure 9:
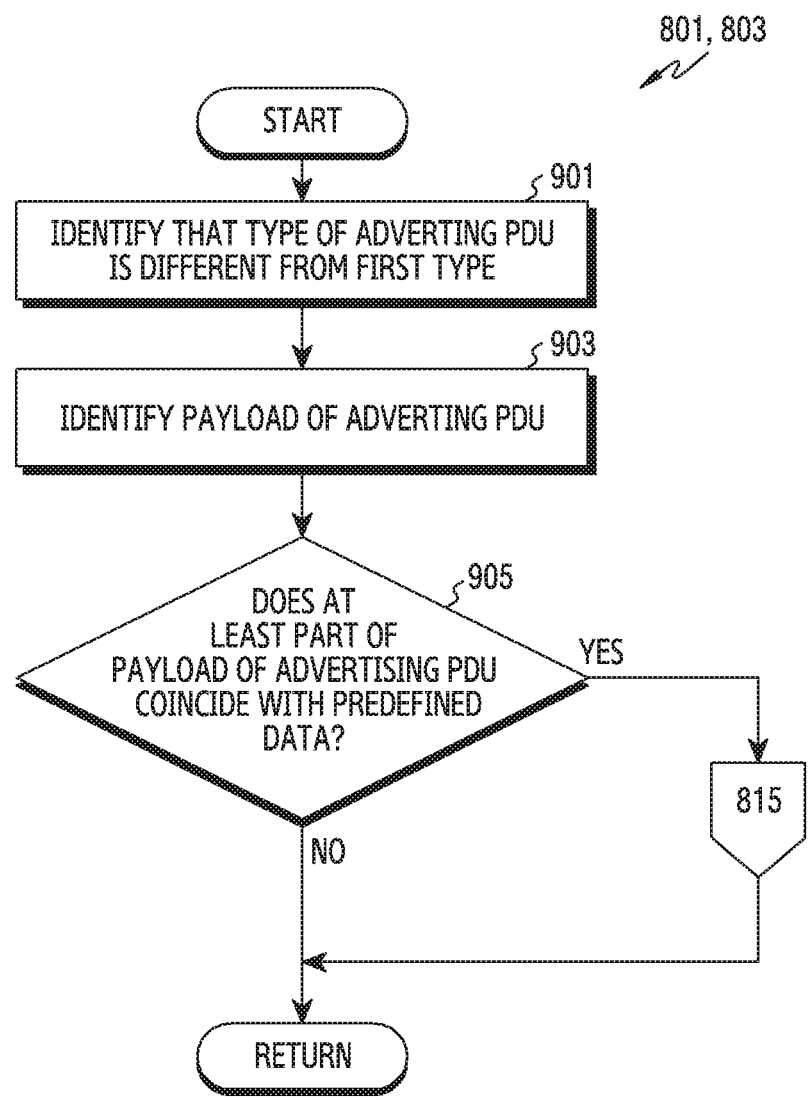
FIG. 9 illustrates an operation of processing an advertising packet on the basis of predefined data according to various embodiments of the disclosure.

FIG. 9 illustrates an operation of processing an advertising packet on the basis of predefined data according to various embodiments of the disclosure. FIG. 9 may include a detailed operation of the electronic device 201 for performing operations 801 and 803 of FIG. 8.

Referring to FIG. 9, in operation 901, the communication module 320 may identify that a type of an advertising PDU is different from the first type. The communication module 320 may acquire PDU_Type data by decoding a header of the advertising PDU. The communication module 320 may identify that the type of the advertising PDU corresponds to one of the second type, the ADV_DIRECT_IND type, or the ADV_NONCONN_IND type on the basis of the acquired PDU_Type data. For example, if a value indicating the first type is predetermined as 1000, the communication module 320 may identify that the value of the PDU_Type data is not 1000.

In operation 903, the communication module 320 may identify a payload of the advertising PDU. The communication module 320 may identify a length of advertising data included in a payload by decoding data indicating a length of the payload included in the header. The communication module 320 may decode the advertising data on the basis of the identified payload length.

In operation 905, the communication module 320 may determine whether at least part of the payload of the advertising PDU coincides with predefined data. According to an embodiment, the advertising data included in the payload may include a flag, a first service Universally Unique IDentifier (UUID), and a second service UUID. The first service UUID and the second service UUID may indicate a service that can be provided using the electronic device 201. The services that can be provided by the electronic device 201 may be stored in a form of a profile in GAPP of the host layer 420. The first service UUID may include, for example, a 16-bit value selected from a Bluetooth Special Interest Group (SIG). The second service UUID may be randomly defined by the electronic device 201, and may include, for example, a 128-bit value.

According to various embodiments, the predefined data may include a service UUID value. For example, the service UUID value may be defined for the external electronic device 202 (e.g., an electronic pen). For example, the first service UUID for the external electronic device 202 may be defined as 0xFDDB, and the second service UUID for the external electronic device 202 may be defined as EDFEC62E-9910-0BAC-5241-D8BDA6932A2F. The predefined data may include at least part of the first service UUID value, or may include at least part of the second service UUID value. The communication module 320 may acquire advertising data included in the payload, and may identify whether the predefined data is included among the service UUID values for the external electronic device 202.

According to various embodiments, if at least part of the payload of the advertising PDU coincides with the predefined data, the communication module 320 may perform operation 815. On the basis of the coincidence, the communication module 320 may provide control to bypass transmission of the scan request, to perform only scan filtering, and to transmit an advertising notification to the processor 310.

Although it is described in the aforementioned embodiment that the predefined data includes at least part of the service UUID value, the disclosure is not limited thereto. According to various embodiments, the predefined data may include at least some of different field values of the advertising data. For example, the different field values of the advertising data may be a different field value defined in the BLE standard such as a flag (a data type value=0x01), a local name (a data type value=0x09), or a shortened local name (a data type value=0x08).

Although it is described in the aforementioned embodiment that the predefined data refers to data for one field value, the disclosure is not limited thereto. The predefined data may include data for at least one field value among a plurality of fields. For example, the predefined data may include all of data for a first field (e.g., a flag field) value and data for a second field (e.g., a second service UUID field) value among the plurality of fields. That is, the electronic device 201 may decide whether the second service UUID field value and the flag field value are included in the predefined data. For another example, the predefined data may include data for one field value among data for a first field (e.g., flag field) value and data for a second field (e.g., first service UUID field) value among the plurality of fields. That is, the electronic device 201 may decide whether the flag field value is included in the predefined data or the first service UUID field value is included in the predefined data.

Referring to FIG. 8 and FIG. 9, although it is described that the operation 905 for deciding whether at least part of the payload of the advertising PDU coincides with the predefined data is performed later than the operation 801 for deciding whether the type of the advertising PDU coincides with the first type, the disclosure is not limited thereto. In various embodiments, the communication module 320 may identify a payload before identifying the type of the advertising PDU. The communication module 320 may selectively decode a field for indicating a length of the payload among data included in the header. The communication module 320 may decode the payload on the basis of a field value indicating a length of the decoded payload. The communication module 320 may determine whether at least part of the payload coincides with predefined data. For example, it may be determined whether at least part of data indicating a service UUID included in the payload coincides with the predefined data. Although it is described in various embodiments that the communication module 320 identifies whether the type of the advertising PDU corresponds to the first type, and if the type of the advertising PDU does not correspond to the first type, determines that the at least part of the payload of the advertising PDU coincides with the predefined data, the disclosure is not limited thereto. The communication module 320 may bypass the identifying of the type of the received advertising PDU, and may independently perform whether at least part of the payload of the advertising PDU coincides with the predefined data.

Figure 10:
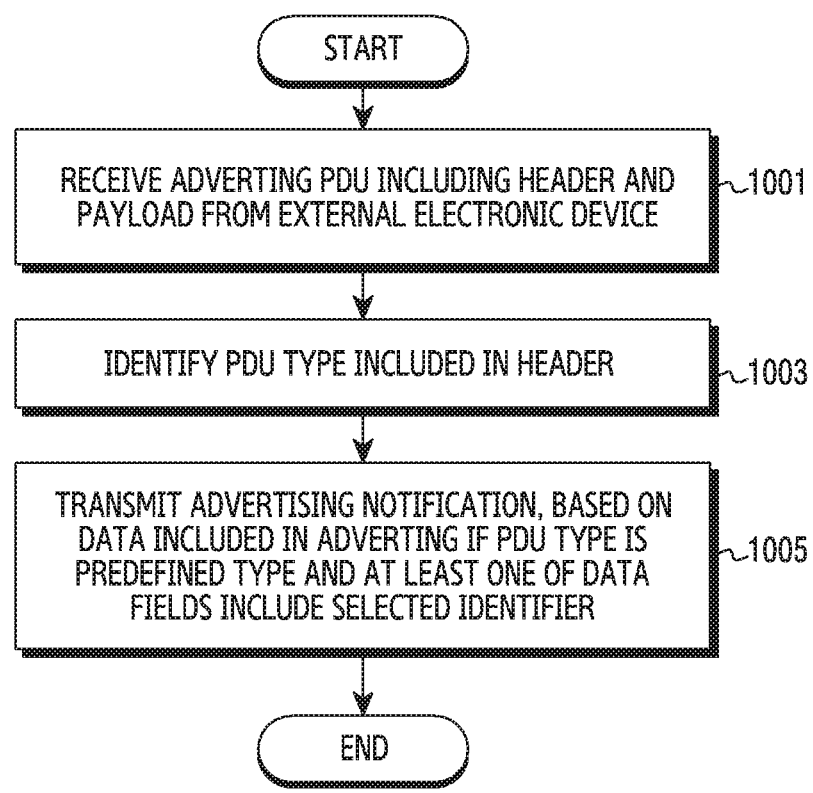
FIG. 10 illustrates an operation of an electronic device according to various embodiments of the disclosure.

FIG. 10 illustrates an operation of the electronic device 201 according to various embodiments of the disclosure.

Referring to FIG. 10, in operation 1001, the communication module 320 of the electronic device 201 may receive an advertising PDU including a header and a payload from the external electronic device 202. The external electronic device 202 may correspond to a device to be paired with the electronic device 301. For example, the external electronic device 202 may correspond to an electronic pen.

In operation 1003, the communication module 320 of the electronic device 201 may identify a type of an advertising PDU included in the header. The advertising PDU may include the header and the payload, and the header may include a PDU_Type field. The electronic device 201 may decode the PDU_Type field to acquire data indicating the type of the advertising PDU. The communication module 320 may identify the type of the advertising PDU on the basis of the acquired data. For example, the type of the advertising PDU may include a first type or a predefined type. The predefined type may include types defined in the BLE standard. For example, the predefined type may include one of an ADV_IND type, an ADV_SCAN_IND type, and ADV_NONCONN_IND type, and an ADV_DIRECT_IND type. The first type may refer to a type different from the predefined type and not defined in the BLE standard. The first type may correspond to a type indicating not to request the external electronic device 202 to provide additional information even though the advertising PDU is received while the communication module 320 operates in a mode for active scanning.

In operation 1005, if the PDU type corresponds to the predefined type and at least some of the data fields includes a selected identifier, the electronic device 201 may transmit an advertising notification on the basis of data included in advertising. The predefined type may include types defined in the BLE standard. The predefined type may correspond to an ADV_IND type, an ADV_SCAN_IND type, an ADV_NONCONN_IND type, or an ADV_DIRECT_IND type. The data field may correspond to at least one field among fields included in the payload. The selected identifier may correspond to an identifier including predefined data. The selected identifier may be information for representing a service UUID indicating a service that can be provided by the electronic device 201. For example, the selected identifier may be information for representing a service UUID indicating a service using the external electronic device 202. If the PDU type corresponds to the predefined type and if at least one of the data fields includes the selected identifier, the communication module 320 of the electronic device 201 may transmit an advertising notification to the processor 310. For example, even if the PDU type corresponds to the predefined type, when at least one of the data fields include the selected identifier, the communication module 320 may bypass transmission of a scan request to the external electronic device 202. The communication module 320 may bypass the scan request and transmit the advertising notification to the processor 310. The advertising notification may refer to control information transmitted from the communication module 320 to the processor 310, and may further include information indicating that the advertising notification is generated based on the identifier.

Figure 11:
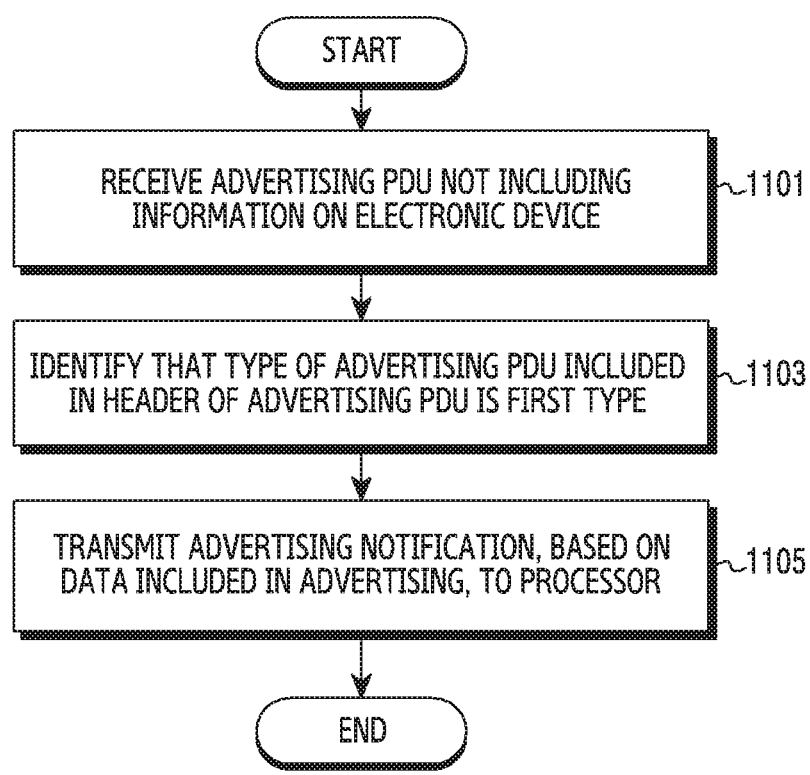
FIG. 11 illustrates an operation of an electronic device according to various embodiments of the disclosure.

FIG. 11 illustrates an operation of the electronic device 201 according to various embodiments of the disclosure.

Referring to FIG. 11, in operation 1101, the electronic device 201 may receive an advertising PDU from the external electronic device 202 by using the communication module 320. The advertising PDU may refer to a PDU included in an advertising packet. The advertising PDU may refer to a PDU when a type of the PDU included in the advertising packet corresponds to one of an ADV_IND type, an ADV_SCAN_IND type, an ADV_NONCONN_IND type, and a newly defined type (e.g., a first type). For example, the received advertising PDU may not include the advertising PDU of the ADV_DIRECT_IND type. Upon receiving the advertising PDU of the ADV_DIRECT_IND type, the communication module 320 may bypass transmission of a scan request and transmit a connection initiation to the external electronic device 202 only when scanner address information included in the advertising PDU of the ADV_DIRECT_IND type coincides with address information of the electronic device 201. This is because the advertising PDU of the ADV_DIRECT_IND type corresponds to only an advertising packet transmitted/received between a scanner and an advertiser having a BLE connection history, and may not be suitable for an advertising packet for an initial connection.

In operation 1103, the electronic device 201 may identify that a type of an advertising PDU included in a header of the advertising PDU is a first type. The advertising PDU may include a header. The header may include a PDU_Type field. The electronic device 201 may receive an advertising PDU not including information on the electronic device 201. Among the types of the advertising PDU, ADV_DIRECT_IND may include the information on the electronic device 201. The information on the electronic device 201 may include information on a Bluetooth address of the electronic device 201. ADV_DIRECT_IND may be an advertising packet for a fast re-connection with a previously connected electronic device 201. Therefore, upon receiving the advertising PDU including the information on the electronic device 201, the electronic device 201 may be configured to transmit a connection initiation to the external electronic device 202. Upon receiving the advertising PDU not including the information on the electronic device 201, the electronic device 201 may identify a type of the advertising PDU by decoding the PDU_Type field. The identified type of the advertising PDU may correspond to one of the ADV_IND type, the ADV_SCAN_IND type, the ADV_NONCONN_IND type, and the first type. The first type is a type not defined in the BLE standard, and may refer to a type different from the ADV_IND type, the ADV_SCAN_IND type, and the ADV_NONCONN_IND type. The first type may correspond to a type indicating not to request the external electronic device 202 to provide additional information even though the advertising PDU is received while the communication module 320 operates in a mode for active scanning.

In operation 1105, the electronic device 201 may transmit an advertising notification to the processor 310 on the basis of data included in advertising. The communication module 320 of the electronic device 201 may transmit the advertising notification to the processor 310 on the basis of the data included in the advertising PDU. The data included in the advertising PDU may include the PDU_Type field. If the PDU_Type field indicates the first type not defined in the BLE standard, the communication module 320 of the electronic device 201 may transmit the advertising notification. According to various embodiments, the communication module 320 may receive the advertising PDU of the first type while operating in the first mode for an active scan. The communication module 320 may transmit a scan request, or may transmit the advertising notification to the processor 310 without having to transmit the scan request to the external electronic device 202, on the basis of reception of the advertising PDU of the first type, even though operating in the first mode configured to receive a scan response. Accordingly, the electronic device 201 may bypass the scan request to avoid interference between scan requests transmitted by a plurality of electronic devices (e.g., the second electronic device 203 or the third electronic device 204).

In various embodiments, the electronic device 201 may include the communication module 320 supporting communication based on BLE and the processor 310 operatively coupled to the communication module 320. The processor 310 may be configured to transmit control information to request the communication module 320 to operate in a first mode. Upon receiving an advertising Packet Data Unit (PDU) of predefined types from the external electronic device 202, the first mode may correspond to a mode of controlling the communication module 320 so that a scan request is transmitted to the external electronic device 202 in response to reception of the advertising PDU of the predefined types. The communication module 320 may be configured to receive the advertising PDU from the external electronic device 202, while operating in the first mode, on the basis of the control information, identify that a type of the received advertising PDU corresponds to a first type distinct from the predefined types, on the basis of a header included in the received advertising PDU, bypass transmission of the scan request on the basis of the identifying, and transmit to the processor 310 an advertising notification for representing that the advertising PDU of the first type has been received.

In various embodiments, the predefined types may include ADV_IND or ADV_SCAN_IND.

In various embodiments, the first type may correspond to non-scannable attribute, connectable attribute, and undirected attributes.

In various embodiments, the communication module 320 may be further configured to determine whether address information of the electronic device 201 is included in the received advertising PDU.

In various embodiments, the communication module 320 may be configured to transmit a connection initiation to the external electronic device 202 in response to the identifying that the address information of the electronic device 201 is included in the advertising PDU.

In various embodiments, the first mode may be configured such that the communication module 320 receives a scan response transmitted from the external electronic device 202 in response to the scan request, and transmits an advertising notification to the processor 310 on the basis of the received scan response.

In various embodiments, the communication module 320 may be configured to identify whether predefined data among the remaining data other than the header is included in the received advertising PDU, and transmit an advertising notification to the processor 310 on the basis of the identifying of the predefined data.

In various embodiments, the predefined data may include a Universally Unique IDentifier (UUID).

In various embodiments, the UUID may correspond to information for identifying the external electronic device.

In various embodiments, the advertising notification may include a Media Access Address (MAC) address of the external electronic device 202 and Received Signal Strength Indication (RSSI) information, and the external electronic device 202 may include an electronic pen mountable to a housing of the electronic device 201.

In various embodiments, the electronic device 201 may include a user interface, a wireless communication circuit configured to support Bluetooth Low Energy (BLE) wireless communication, and upon receiving an advertising Packet Data Unit (PDU) of a predefined type from the external electronic device 202, to request the external electronic device 202 for additional information, and the processor 310 operatively coupled to the user interface and the wireless communication circuit. The wireless communication circuit may be configured to receive the advertising PDU including a header and a payload from the external electronic device 202, identify a type of the advertising PDU included in the header of the advertising PDU, identify a data type included in the payload of the advertising PDU, and transmit an advertising notification to the processor 310 on the basis of data included in the advertising in a state of not transmitting the additional information request to the external electronic device 202, if the identified type of the advertising PDU is the predefined type and if at least one of the data types includes a selected identifier.

In various embodiments, the predefined type may include one of the ADV_IND type, the ADV_SCAN_IND type, the ADV_NONCONN_IND type, and the ADV_DIRECT_IND type.

In various embodiments, the advertising notification may include a type of the advertising data, a Bluetooth address of the external electronic device 202, and/or a Received Signal Strength Indication (RSSI).

In various embodiments, the electronic device 201 may include a memory operatively coupled to the processor 310. When executed, the memory may store instructions for allowing the processor 310 to request the wireless communication circuit to establish a connection with the external electronic device 202 on the basis of reception of the advertising notification.

In various embodiments, the external electronic device 202 may include a stylus pen.

In various embodiments, the electronic device 201 may include a user interface, a wireless communication circuit configured to support Bluetooth Low Energy (BLE) wireless communication and to receive an advertising Packet Data Unit (PDU) including a header including a field indicating a type of an advertising PDU from the external electronic device 202, and the processor 310 operatively coupled to the user interface and the wireless communication circuit. The wireless communication circuit may be configured to receive, from the external electronic device 202, an advertising PDU not including information on the electronic device, identify that a type of the advertising PDU included in a header of the advertising PDU is a first type, and transmit to the processor 310 an advertising notification on the basis of data included in the advertising in a state of not transmitting the additional information request to the external electronic device 202 on the basis of the first type.

In various embodiments, the communication module 320 may be further configured to transmit a connection initiation to the external electronic device 202. The first type may not correspond to a connectable undirected event, connectable directed event, non-connectable undirected event, or scannable undirected event of a BLE standard.

In various embodiments, the information on the electronic device 201 may include a Bluetooth address of the electronic device 201.

In various embodiments, the electronic device 201 may include a main processor and an auxiliary processor, and the auxiliary processor may be configured to consume less power than the main processor, or control a specified function.

In various embodiments, the electronic device 201 may further comprise a power management module to manage power supplied to the electronic device, wherein the power management module includes a power management integrated circuit (PMIC).

In various embodiments, the electronic device 201 may further comprise a battery to supply power to at least one component of the electronic device, wherein the battery includes at least one of a primary cell which is not rechargeable, a secondary cell which is rechargeable, or a fuel cell.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuitry to support communication based on Bluetooth Low Energy (BLE); and
at least one processor operatively coupled to the communication circuitry,
wherein the at least one processor is configured to transmit control information to request the communication circuitry to operate in a first mode,
wherein upon receiving an advertising Packet Data Unit (PDU) of predefined types from an external electronic device, the first mode corresponds to a mode of controlling the communication circuitry so that a scan request is transmitted to the external electronic device in response to reception of the advertising PDU of the predefined types, and
wherein the communication circuitry is configured to:
receive the advertising PDU from the external electronic device, while operating in the first mode, in response to the control information,
identify that a type of the received advertising PDU corresponds to a first type distinct from the predefined types, on the basis of a header included in the received advertising PDU, and
if the type of the received advertising PDU corresponds to the first type distinct from the predefined types:
bypass transmission of the scan request, and
transmit to the at least one processor an advertising notification for representing that the advertising PDU of the first type has been received.

2. The electronic device of claim 1, wherein the predefined types comprise at least one of an ADV_IND type or an ADV_SCAN_IND type.

3. The electronic device of claim 1, wherein the first type corresponds to at least one of a non-scannable attribute, a connectable attribute, or an undirected attribute.

4. The electronic device of claim 1, wherein the communication circuitry is further configured to determine whether address information of the electronic device is included in the received advertising PDU.

5. The electronic device of claim 4, wherein the communication circuitry is further configured to transmit a connection initiation to the external electronic device in response to the identifying that the address information of the electronic device is included in the advertising PDU.

6. The electronic device of claim 5, wherein the first mode configures the communication circuitry to:
receive a scan response transmitted from the external electronic device in response to the scan request, and
transmit an advertising notification to the at least one processor in response to the received scan response.

7. The electronic device of claim 1, wherein the communication circuitry is further configured to:
identify whether predefined data among remaining data other than the header is included in the received advertising PDU; and
transmit an advertising notification to the at least one processor in response to the identifying of the predefined data.

8. The electronic device of claim 7, wherein the predefined data comprises a Universally Unique IDentifier (UUID).

9. The electronic device of claim 8, wherein the UUID corresponds to information for identifying the external electronic device.

10. The electronic device of claim 4,
wherein the advertising notification comprises a Media Access Address (MAC) address of the external electronic device and Received Signal Strength Indication (RSSI) information, and
wherein the external electronic device comprises an electronic pen mountable to a housing of the electronic device.

11. An electronic device comprising:
a user interface;
a wireless communication circuit configured to support Bluetooth Low Energy (BLE) wireless communication, and upon receiving an advertising Packet Data Unit (PDU) of a predefined type from an external electronic device, to request the external electronic device for additional information; and
at least one processor operatively coupled to the user interface and the wireless communication circuit,
wherein the wireless communication circuit is configured to:
receive the advertising PDU, the PDU comprising a header and a payload, from the external electronic device,
identify a type of the advertising PDU included in the header of the advertising PDU,
identify a data type included in the payload of the advertising PDU, and
transmit an advertising notification to the at least one processor on the basis of data included in the advertising PDU and withhold transmission of the additional information request to the external electronic device, if the identified type of the advertising PDU is the predefined type and at least one of the data types comprises a selected identifier.

12. The electronic device of claim 11, wherein the predefined type comprises at least one of an ADV_IND type, an ADV_SCAN_IND type, an ADV_NONCONN_IND type, or an ADV_DIRECT_IND type.

13. The electronic device of claim 11, wherein the advertising notification comprises at least one of a type of the data included in the advertising PDU, a Bluetooth address of the external electronic device, or a Received Signal Strength Indication (RSSI).

14. The electronic device of claim 11,
wherein the electronic device comprises a memory operatively coupled to the at least one processor, and
wherein the memory stores instructions, when executed, for allowing the at least one processor to request the wireless communication circuit to establish a connection with the external electronic device in response to reception of the advertising notification.

15. The electronic device of claim 11, wherein the external electronic device comprises a stylus pen.

16. An electronic device comprising:
a user interface;
a wireless communication circuit configured to support Bluetooth Low Energy (BLE) wireless communication and to receive an advertising Packet Data Unit (PDU) comprising a header including a field indicating a type of an advertising PDU from an external electronic device; and
at least one processor operatively coupled to the user interface and the wireless communication circuit, wherein the wireless communication circuit is configured to:
  receive, from the external electronic device, the advertising PDU not including information on the electronic device,
  identify that a type of the advertising PDU included in the header of the advertising PDU is a first type, and
  transmit to the at least one processor an advertising notification on the basis of data included in the advertising PDU and withhold transmission of an additional information request to the external electronic device in response to identification that the type of the advertising PDU is the first type.

17. The electronic device of claim 16,
  wherein the wireless communication circuit is further configured to transmit a connection initiation to the external electronic device, and
  wherein the first type does not correspond to a connectable undirected event, connectable directed event, non-connectable undirected event, or scannable undirected event of a BLE standard.

18. The electronic device of claim 16, wherein the information on the electronic device comprises a Bluetooth address of the electronic device.

19. The electronic device of claim 16, wherein the first type corresponds to non-scannable, connectable, and undirected events.

20. The electronic device of claim 16, wherein the external electronic device comprises a stylus pen.

21. The electronic device of claim 16, wherein the first type comprises an ADV_DIRECT_IND type and scanner address information included in the advertising PDU coincides with address information of the electronic device.

22. The electronic device of claim 16, further comprising transmitting a connection initiation to the external electronic device.

* * * * *